ന്റെ3,804,912
PROCESS FOR THE PREPARATION OF ETHYLIDENE NORBORNENES
Meindert B. Vellinga, Venlo, Frits Hartog, Beek, and Johan P. H. Von Den Hoff, Geleen, Netherlands, assignors to Stamicarbon N.V., Heerlen, Netherlands
No Drawing. Filed Nov. 23, 1971, Ser. No. 201,386
Claims priority, application Netherlands, Nov. 26, 1970, 7017274
Int. Cl. C07c 5/24
U.S. Cl. 260—666 PY    16 Claims

ABSTRACT OF THE DISCLOSURE

A process for isomerizing vinyl norbornenes into ethylidene norbornenes is disclosed, wherein said isomerization is conducted in the presence of Group II–A and/or Group II–B of the Periodic System oxide catalyst. The catalyst system results in high conversions and catalyst capacities. The resulting ethylidene norbornenes are known products having known uses, such as, e.g. comonomers with ethylene and propylene for the production of elastomeric copolymers.

BACKGROUND OF THE PRIOR ART

U.S. Pat. No. 3,347,944, which discloses that ethylidene norbornenes can be prepared by isomerizing vinyl norbornenes, is incorporated herein by reference for the teachings of suitable vinyl norbornenes which can be isomerized into corresponding ethylidene norbornenes. The prior art has known that the isomerization can be conducted in the presence of specific catalyst systems known to the prior art. However, the catalyst systems known to the prior art have not been commercially suitable in all respects, having specific drawbacks, such as, for instance, difficulties in handling same, high cost involved in using same, and the like.

SUMMARY OF THE INVENTION

Vinyl norbornenes are isomerized to ethylidene norbornenes in the presence of a catalyst system comprising at least one oxide of an element of Group II–A and/or Group II–B of the Mendeléef Periodic System. The drawbacks mentioned above as to prior art catalytic systems are obviated with the use of the Group II–A and/or Group II–B oxide catalyst of the present invention.

DESCRIPTION OF THE INVENTION

The present invention is directed to a process for preparing ethylidene norbornenes. The term "ethylidene norbornenes," as used herein, refers to the group of compounds possessing the carbon skeleton of bicyclo[2,2,1]-heptene-2, with one or more carbon atoms of such skeleton carrying an ethylidene group thereon. The ethylidene norbornenes are prepared by isomerizing vinyl norbornenes in the presence of an oxide of an element of Group II–A and/or Group II–B of the Periodic System. "Vinyl norbornenes," as used herein, refers to compounds corresponding to the ethylidene norbornenes described above wherein at least one of the ethylidene radicals is a vinyl radical. Preferably, the catalyst is an oxide of magnesium, calcium, strontium, barium, zinc or cadmium or mixtures thereof. Such oxide catalysts are relatively cheap and can be handled without undue difficulty.

It is preferred that the oxide catalyst be prepared by heating oxide precursors of elements of Group II–A and/or Group II–B of the Periodic System. Suitable oxide precursors include carbonates, hydroxides, sulphites, nitrates, oxalates and other compounds, including organic compounds, that yield oxides upon heating. The heating temperature to convert the oxide precursor to the oxide will generally be in the range of 300–1000° C., but below the bulk sintering temperature of the resulting oxide. When the oxide of an element of Group II–A and/or Group II–B of the Periodic System is already formed, it is still preferred to heat same within the range of 300–1000° C., as the catalyst activity will thereby be increased. The catalyst activity can be even further increased by passing hydrogen, nitrogen, or other inert gas over the catalyst during this heating step.

The present invention contemplates the use of mixtures of oxides or mixed oxidic compounds of various elements of Groups II–A and Group II–B of the Periodic System. For instance, dolomite (calcium magnesium carbonate) may be heated at 800° C. for a period of 10–20 hours to produce a mixed calcium magnesium oxide which is suitable as an isomerization catalyst in the present process. If the dolomite is heated at a lower temperature, or over a shorter time period, the resulting product will generally contain unconverted calcium carbonate and possibly magnesium carbonate in addition to the magnesium oxide. This latter product may also be employed to catalyze the isomerization of vinyl norbornenes into ethylidene norbornenes. However, the catalytic activity will naturally be lower than that of the fully converted dolomite.

In some instances, it may be desirable to support the catalyst of the present invention on inert carriers, and this use of inert carriers is well within the skill of those in the art. Various types of inert carriers may be used, but titanium dioxide has been found to be particularly preferred.

It is especially preferred to use an isomerization catalyst system comprising magnesium oxide. Such a magnesium oxide catalyst system allows high degrees of conversion while at the same time being very cheap and very easy to handle.

A very active but low cost magnesium oxide catalyst can be obtained by calcining nesquehonite

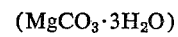

$$(MgCO_3 \cdot 3H_2O)$$

An even cheaper starting material, which gives generally comparable results, is basic or neutral magnesium carbonate. These starting materials can be readily calcined at a temperature above 400° C. In commercial practice, the calcining temperature will preferably be below 500° C. in order to permit the use of ordinary steel equipment.

The mechanical strength of the catalyst system comprising magnesium oxide, such as that formed by calcining basic or neutral magnesium carbonate, can be improved by mixing the starting material, e.g. the carbonate, with 5–20% by weight of bentonite. The mechanical strength of the catalyst will be improved with no adverse influence on the activity, selectivity and capacity of the catalyst after calcining. "Catalyst capacity" as used herein, refers to the amount of vinyl norbornene which can be converted over a given amount of oxide catalyst before the catalyst loses its activity.

High degrees of conversion of vinyl norbornene into ethylidene norbornenes are also realized if barium oxide is used as the isomerization catalyst, but barium oxide is more expensive and slightly less easy to handle, because of its toxicity, than magnesium oxide, and therefore is less preferred than magnesium oxide. In general, the oxides of elements of Group II–A give higher degrees of conversion than the oxides of elements of Group II–B of the Periodic System, under otherwise identical conditions.

The prior art vinyl norbornene isomerization processes, such as that acknowledged above, generally conducted the isomerization in the liquid phase, sometimes with the use of an inert solvent, over the prior art catalyst systems. The present process can alo be conducted in the liquid phase, but it is preferred to conduct the present process in the gaseous phase, as this has the distinct advantage that a much higher catalyst capacity will be realized. The isomerization reaction temperature, for either liquid or gaseous phase reactions, will preferably be between 20° C. and 200° C., more preferably between 140 and 150° C. Below 20° C. the reaction rate is very low whereas above 160° C. the process efficiency decreases due to the formation of undesired byproducts. Above 200° C. the reaction efficiency is very low and strong fouling of the catalyst occurs. The process is conveniently conducted at atmospheric pressure, although higher and lower pressures may be used if desired.

When the polymerization reaction is conducted in the gaseous phase, the vinyl norbornenes may be passed through the metal oxide catalyst bed in undiluted form. However, it is greatly preferred that the vinyl norbornenes be diluted with an inert gas, as much better process control will hereby be realized. Nitrogen, because of its availability and low cost, is the preferred inert gas. One part of vinyl norbornene may be mixed with 1-20 parts of inert gas, preferably about 3-10 parts of inert gas. Of course, higher and lower inert gas dilutions may be used if desired, but no advantages are obtained thereby.

The amount of catalyst used, based on the amount of vinyl norbornene in the reaction zone, is not critical. Preferably, some 0.001 to 20 g. of metal oxide catalyst will be used per gram of vinyl norbornene to be converted. Smaller amounts of catalyst generally result in unduly slow reaction rates, while larger amounts of the catalyst produce a faster reaction rate but also increase catalyst expenses. Generally, only in the case of extremely cheap catalyst systems, e.g. calcined dolomite, or the like, is it economically justified to use more than 1.4 g. of catalyst per gram of vinyl norbornene to be converted.

The process of the present invention may be conducted in a continuous or discontinuous manner. If the process is conducted in the gaseous phase with the continuous isomerization of vinyl norbornenes, the residence time may be as short as 6-30 seconds, whereas with the liquid phase isomerization, it is preferred to use a residence time of 5-30 minutes. If maximum conversion is desired, gaseous flow rates of the vinyl norbornene to be converted are preferably not higher than 1.6 g. per hour per gram of catalyst. If a lower conversion is admissible higher flow rates can be used. The process of the present invention is particularly suited for the isomerization of 5-vinyl norbornene-2 into 5-ethylidene norbornene-2. The reaction proceeds very smoothly, with almost no formation of byproducts. 5-ethylidene norbornene-2 is a known compound which is employed as the third monomer in the manufacture of elastomeric co-polymers from ethylene, propylene and the third monomer.

The conversion of 5-vinyl norbornene-2 into 5-ethylidene norbornene-2 under the influence of a catalyst system comprising at least one oxide of a metal of Group II-A and/or Group II-B of the Periodic System can be easily stopped at a conversion lower than the maximum conversion attainable. For instance, the reaction may be stopped, in the case of discontinuous operations, by cooling the reaction zone, or, in the case of continuous operation, by control of the vinyl norbornene flow rate, the reaction temperature, or other process parameters. This ease of controlling the vinyl norbornene conversion rate makes the process of the present invention particularly suited for the preparation of mixtures of 5-vinyl norbornene-2 and 5-ethylidene norbornene-2 which contain essentially no undesirable byproducts, such as bicyclo nonadiene. Such mixtures may advantageously be employed in the manufacturer of elastomeric copolymers from ethylene, propylene, and such mixtures. The resulting elastomeric copolymers have low cold flow and warm flow values compared with analogous copolymers of ethylene, propylene and 5-ethylidene norbornene-2 alone. These elastomeric copolymers with low cold and warm flow values, have a distinct advantage in being more easily processed than similar copolymers with higher cold and warm flow values. Preferably, the above mixtures contain 2-40% by weight of 5-vinyl norbornene-2 and 60-98% by weight of 5-ethylidene norborne-2 to produce copolymers with ethylene and propylene having particularly advantageous cold and warm flow values.

While the vinyl norbornene is preferably 5-vinyl norbornene-2, other vinyl norbornenes can be used in the present invention, including those of the general formula

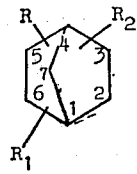

wherein R is vinyl, and $R_1$ and $R_2$ are independently hydrogen, vinyl or lower alkyl, or $R_1$–$R_2$, is a hydrocarbon residue with up to 10 carbon atoms closing a carbon ring system with 5-12 ring members. Upon isomerization, a compound of the following formula will be produced:

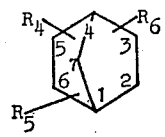

wherein $R_4$ is ethylidene and $R_5$ and $R_6$ are independently hydrogen, vinyl, ethylidene or lower alkyl, or $R_5$–$R_6$ is a hydrocarbon residue with up to 10 carbon atoms, closing a carbon ring system with 5-12 ring members. Examples of additional suitable vinyl norbornene starting materials include 7,7-dimethyl 5-vinyl norbornene-2, 2-methyl 5-vinyl norbornene-2 and 6-ethyl 5-vinylnorbornene-2

EXAMPLES OF THE INVENTION

The invention will be understood more readily by reference to the following examples; however, these examples are intended to illustrate the invention and are not to be construed to limit the scope of the invention. In the examples, the detection limit for byproducts in the reaction mixtures was 0.1%.

EXAMPLE 1

10 g. of liquid 5-vinyl norbornene-2 were heated at 140° C. in the presence of 2 g. of magnesium oxide (the magnesium oxide had been prepared by heating magnesium oxalate at 450° C. in a stream of dry nitrogen for 64 hours. After 30 minutes, 90% by weight of the 5-vinyl norbornene-2 was converted into 5-ethylidene norbornene-2 and after 60 minutes the conversion was 95% by weight. Byproducts could not be detected in the reaction mixture.

EXAMPLE 2

The process of Example 1 was repeated except 3 g. of magnesium oxide was used. After 15 minutes, 93.4% by weight of the 5-vinyl norbornene-2 was converted into 5-ethylidene norbornene-2, and after 60 minutes the conversion was 98.1% by weight. Byproducts could not be detected in the reaction mixture.

EXAMPLE 3

15 g. of liquid 5-vinyl norbornene-2 were heated with shaking at 20° C. in the presence of 1 g. of magnesium oxide (prepared by the method described in Example 1). After being shaken for 70 hours, 15% by weight of the vinyl norbornene had been converted into 5-ethylidene norbornene-2. No byproducts could be detected.

EXAMPLE 4

A gaseous mixture of 90% by volume of dry nitrogen and 10% by volume of 5-vinyl norbornene-2 vapors was continuously passed at 150° C. over a magnesium oxide catalyst (which was prepared as described in Example 1). The flow rate of the 5-vinyl norbornene-2 was 0.4 g. per hour per g. of catalyst. The 5-vinyl norbornene-2 had a residence time in the reaction zone of 0.3 minute. The reaction was continued for 3 hours without a significant decrease in the catalyst activity. 98.3 percent by weight of the 5-vinyl norbornene-2 was isomerized into 5-ethylidene norbornene-2, and no byproducts could be detected.

EXAMPLE 5

Nesquehonite, having an approximate composition $MgCO_3.3 H_2O$ was heated for 64 hours at 575° C. in a flow of dry nitrogen. The nesquehonite was substantially completely converted into magnesium oxide.

The gaseous mixture of 90 parts by volume of hydrogen and 10 parts by volume of gaseous 5-vinyl norbornene-2 was continuously passed over a bed of the magnesium oxide product above, at a temperature of 150° C. The flow rate of the 5-vinyl norbornene-2 was 1.43 g. per hour per g. of catalyst. The residence time of the vapor in the reaction zone was 0.15 minute. The first 30 minutes of the process produced a mixed product containing 42% of 5-vinyl norbornene-2 and 58% of 5-ethylidene norbornene-2.

EXAMPLE 6

Barium oxide was prepared by heating hydrated barium oxalate for 16 hours at 800° C. in a flow of dry nitrogen.

A gaseous mixture of 90% by volume of nitrogen and 10% by volume of 5-vinyl norbornene-2 was continuously passed over a bed of the barium oxide at a temperature of 150° C. The flow rate of the 5-vinyl norbornene-2 was 0.2 g. per hour per g. of catalyst. The residence time in the reaction zone was 0.2 minute.

After 1 hour of operation, 97.7 percent by weight of the 5-vinyl norbornene-2 had been converted into 5-ethylidene norbornene-2, with no byproducts detected.

EXAMPLE 7

Calcium magnesium oxide was prepared by heating dolomite for 17 hours at 800° C. in a flow of dry nitrogen.

The process of Example 1 was repeated, using the above calcium magnesium oxide as the metal oxide catalyst. After 30 minutes, 7% by weight of the 5-vinyl norbornene-2 had been isomerized into 5-ethylidene norbornene-2. After 60 minutes, the conversion of 5-vinyl norbornene-2 into 5-ethylidene norbornene-2 had not increased, and 0.3 weight percent of byproduct, mainly bicyclononadiene, could be detected.

EXAMPLE 8

Zinc oxalate was prepared by precipitation of a 15 weight percent aqueous solution of zinc acetate with a 10 mol percent excess of oxalic acid. This zinc oxalate was converted into zinc oxide by heating for 70 hours at 400° C. in a flow of dry nitrogen. The zinc oxide was subjected to an after treatment by heating for 60 hours at 450° C. in a flow of dry nitrogen.

A gaseous mixture of 90% by volume of nitrogen and 10% by volume of gaseous 5-vinyl norbornene-2 was continuously passed over the above zinc oxide at a temperature of 150° C. The flow rate of the 5-vinyl norbornene-2 was 0.61 g. per hour per g. of zinc oxide, and the residence time in the reaction zone was 0.15 minute. After 30 minutes of operation 70% by weight of the 5-vinyl norbornene-2 had been isomerized into 5-ethylidene norbornene-2, and no byproducts were detected.

What is claimed is:

1. In a process for preparing an ethylidene norbornene, said process comprising isomerizing a vinyl norbornene to said ethylidene norbornene at a temperature of about 20–200° C. in contact with a catalyst, the improvement comprising using, as said catalyst, a catalyst consisting essentially of at least one oxide of an element of Group II–A or II–B of the Periodic System.

2. The process as claimed in claim 1, wherein said oxide is selected from the group consisting of oxides of magnesium, calcium, strontium, barium, zinc, cadmium, and mixtures thereof.

3. The process as claimed in claim 2, wherein said oxide is magnesium oxide.

4. The process as claimed in claim 3, wherein said magnesium oxide catalyst is prepared by heating basic or neutral magnesium carbonate at a temperature above 400° C.

5. The process as claimed in claim 4, wherein said magnesium carbonate is heated to a temperature below 500° C.

6. The process as claimed in claim 4, wherein said magnesium carbonate is mixed with about 5 to about 20% by weight of bentonite prior to heating.

7. The process as claimed in claim 2, wherein said vinyl norbornene is 5-vinyl norbornene-2, and said ethylidene norbornene is 5-ethylidene norbornene-2.

8. The process as claimed in claim 7, wherein said 5-vinyl norbornene-2 is incompletely isomerized to produce a mixture containing about 60 to about 98% by weight of 5-ethylidene norbornene-2 and about 40 to about 2% by weight of 5-vinyl norbornene-2.

9. The process as claimed in claim 1 wherein said oxide is prepared by heating an oxide precursor to a temperature of 300–1000° C. and below the bulk-sintering temperature of said oxide.

10. The process as claimed in claim 2, wherein said oxide catalyst is supported on an inert carrier.

11. The process as claimed in claim 10, wherein said inert carrier is titanium dioxide.

12. The process as claimed in claim 2, wherein said oxide is barium oxide.

13. The process as claimed in claim 2, wherein the isomerization is conducted in a liquid phase.

14. The process as claimed in claim 2, wherein the isomerization is conducted in the gaseous phase.

15. The process as claimed in claim 14, wherein the isomerization temperature is 140–150° C.

16. The process as claimed in claim 15, wherein said oxide is magnesium oxide.

References Cited

UNITED STATES PATENTS

| | | | |
|---|---|---|---|
| 2,353,552 | 7/1944 | Drennau | 260—683.2 |
| 2,361,613 | 10/1944 | Drennau | 260—683.2 |
| 3,594,433 | 7/1971 | Schneider | 260—666 |

DELBERT E. GANTZ, Primary Examiner

V. O'KEEFE, Assistant Examiner

UNITED STATES PATENT OFFICE
CERTIFICATE OF CORRECTION

Patent No. 3804912     Dated April 16, 1974

Inventor(s)  Meindert B. Vellinga, Frits Hartog, Johan P.H. Von Den Hoff

It is certified that error appears in the above-identified patent and that said Letters Patent are hereby corrected as shown below:

Column 3, line 14 should read "When the isomerization reaction is conducted in the Column 4, lines 11 - 17, formula should read:

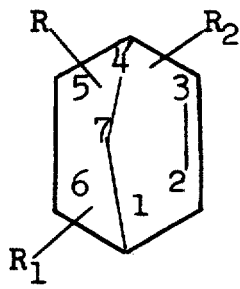

Column 4, lines 23 - 29, formula should read:

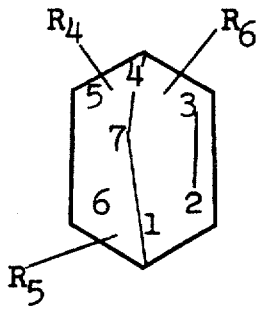

Signed and sealed this 26th day of November 1974.

(SEAL)
Attest:

McCOY M. GIBSON JR.
Attesting Officer

C. MARSHALL DANN
Commissioner of Patents